United States Patent
Aitchison et al.

(10) Patent No.: US 12,043,720 B2
(45) Date of Patent: Jul. 23, 2024

(54) PIEZORESPONSIVE FIBRE REINFORCED POLYMER COMPOSITE

(71) Applicant: Swinburne University of Technology, Hawthorn (AU)

(72) Inventors: Phillip Aitchison, Geelong (AU); Dennis Antiohos, Geelong (AU); Nishar Hameed, Hawthorn (AU); Mojdeh Reghat, Hawthorn (AU); Bronwyn Fox, Hawthorn (AU); Robert Bjekovic, Hawthorn (AU); Lachlan Hyde, Hawthorn (AU); Franz Konstantin Fuss, Hawthorn (AU); Yehuda Weizman, Hawthorn (AU); Adin Ming Tan, Hawthorn (AU)

(73) Assignee: SWINBURNE UNIVERSITY OF TECHNOLOGY, Hawthorn (AU)

(*) Notice: Subject to any disclaimer, the term of this patent is extended or adjusted under 35 U.S.C. 154(b) by 120 days.

(21) Appl. No.: 17/783,203

(22) PCT Filed: Dec. 9, 2020

(86) PCT No.: PCT/AU2020/051344
§ 371 (c)(1),
(2) Date: Jun. 7, 2022

(87) PCT Pub. No.: WO2021/113908
PCT Pub. Date: Jun. 17, 2021

(65) Prior Publication Data
US 2023/0016136 A1    Jan. 19, 2023

(30) Foreign Application Priority Data
Dec. 9, 2019  (AU) .............................. 2019904652

(51) Int. Cl.
| G01L 1/18 | (2006.01) |
| C08J 5/24 | (2006.01) |
| C08K 3/04 | (2006.01) |

(52) U.S. Cl.
CPC ............... *C08K 3/042* (2017.05); *C08J 5/244* (2021.05); *C08J 5/247* (2021.05); *C08J 5/248* (2021.05);
(Continued)

(58) Field of Classification Search
CPC .... C08K 3/042; C08K 2201/001; C08J 5/244; C08J 5/247; C08J 5/248; C08J 5/249;
(Continued)

(56) References Cited

U.S. PATENT DOCUMENTS

| 11,274,393 B2 * | 3/2022 | Aitchison ............ A61B 5/6804 |
| 2018/0195914 A1 | 7/2018 | Benech et al. |
| 2018/0354785 A1 | 12/2018 | Kinloch et al. |

OTHER PUBLICATIONS

Sethy, D. et al., 'Piezoresistive behaviour of graphene nanoplatelet (GNP)/PMMA spray coated sensors on a polymer matrix composite beam', eXPRESS Polymer Letters, vol. 13, No. II, pp. 1018-1025(2019) Abstract; p. 1019: Section 2—Experimental: lines 1-5, 42-49; Figures 1-2, 7.

(Continued)

*Primary Examiner* — Mark Kopec
*Assistant Examiner* — Jaison P Thomas
(74) *Attorney, Agent, or Firm* — Berg Hill Greenleaf Ruscitti LLP

(57) ABSTRACT

A fibre-reinforced polymer composite comprising fibres bound within a solid polymer matrix, wherein at least some of the fibres are in contact with graphene, and wherein the composite changes electrical resistance when deformed.

3 Claims, 4 Drawing Sheets

(52) U.S. Cl.
CPC ............ *C08J 5/249* (2021.05); *G01L 1/18* (2013.01); *C08K 2201/001* (2013.01)

(58) Field of Classification Search
CPC ...... C08J 2363/02; C08J 5/08; C08J 2363/00; G01L 1/18; B32B 5/022; B32B 2250/04; B32B 2250/05; B32B 2250/20; B32B 2255/20; B32B 2260/023; B32B 5/26; B32B 2255/02; B32B 2255/26; B32B 2260/046; B32B 2262/0276; B32B 2262/101; B32B 2307/20; B32B 2307/718; B32B 2457/00; B32B 5/024; B32B 2262/12; B32B 2307/202; B32B 5/08; B32B 5/12; B29C 70/021; B29C 70/882; B29C 70/22
See application file for complete search history.

(56) References Cited

OTHER PUBLICATIONS

Mahmood, H. et al., 'Temperature dependent strain/damage monitoring of glass/epoxy composites with graphene as a piezoresistive interphase', Fibers, vol. 7, No. 17 pp. 1-15 (2019) Abstract; p. 2019, lines 1-10; Figs. 6-7.

Chu, J. et al., 'Graphene-Based Materials as Strain Sensors in Glass Fiber/Epoxy Model Composites', ACS Applied Materials & Interfaces, vol. 11, pp. 31338-31345 (2019), DOI: 10.1021/acsami. 9b09862, Publication Date: Aug. 5, 2019 Abstract; Figs. 3 (b), 2(c), 8; p. 31339, Section 2.5: Epoxy Model Composite Deformation.

Annamahesh A. et al., 'Study on Mechanical Behavior ofGraphene Based Polymer Composites', International Journal of Innovative Technology and Exploring Engineering (IJITEE) ISSN: 2278-3075, vol. 8, Issue 4, pp. 403-406 (2019) Abstract; Section V. Specimen Preparation; Table 2.1; Section I. Introduction; Section VI. Results and Discussion; Fig. 3.2.

International Search Report and Written Opinion in International Application No. PCT I AU2020/051344 filed on Dec. 9, 2020, mailed on Mar. 15, 2021, 10 pages.

* cited by examiner

PIEZORESPONSIVE FIBRE REINFORCED POLYMER COMPOSITE

CROSS REFERENCE TO RELATED APPLICATION

This application is a national stage application under 35 U.S.C. 371 of PCT Application No. PCT/AU2020/051344 having an international filing date of Dec. 9, 2020, which designated the United States, which PCT application claimed the benefit of Australian Application Serial No. 2019904652, filed Dec. 9, 2019, both of which are incorporated by reference in their entirety.

TECHNICAL FIELD

The invention relates to the field of manufacture of piezoresponsive apparatus for the detection of strain or deformation in a structure. In particular, the invention relates to an improved construction of a piezoresponsive apparatus for detection of strain or deformation.

BACKGROUND OF THE INVENTION

A fibre-reinforced polymer (FRP) is a composite material comprising a polymer matrix which is reinforced with fibres. The fibres are usually either glass fibres (in fibreglass), carbon fibres (in carbon fibre reinforced polymer), aramid, or basalt. The polymer is usually an epoxy, vinyl ester, polyester thermosetting plastic, phenol formaldehyde resin, polyurethane or polybenzoxazine.

FRPs have a high strength-to-weight ratio which makes them attractive for many applications. They are commonly used in the aerospace, automotive, marine, and construction industries. FRPs enable manufacturers to consolidate multiple components that were previously typically made from metal, resulting in lighter and more complex parts.

However, this manufacturing practice complicates the detection of damage sustained during manufacture and operation of the FRP part. Being able to detect damage may enable the remaining functional lifetime of a part to be determined and may avoid an unexpected failure.

Traditional strain sensors based on semiconductors, metal foil, and metal oxide films have been employed for structural monitoring. However, conventional metallic strain gauges suffer from a low gauge factor (i.e. the ratio of relative change in electrical resistance to mechanical strain) as well as fixed-direction strain sensing. Also, traditional sensors can be bulky, expensive and are only able to detect local damage.

Another type of sensor used for this purpose is a fibre Bragg grating. Fibre Bragg gratings can be embedded within a composite or applied to the exterior surface. However, fibre Bragg gratings are brittle and can break during handling or operation. Fibre Bragg gratings also require a relatively expensive optical demodulator to detect the optical signal.

Accordingly, it is an object of the invention to provide a that ameliorates at least some of the problems associated with the prior art.

SUMMARY OF THE INVENTION

According to a first aspect of the invention, there is provided a glass fibre-reinforced polymer composite comprising glass fibres bound within a solid polymer matrix, wherein at least some of the fibres are in contact with graphene, and wherein the composite changes electrical resistance when deformed.

According to another aspect of the invention, there is provided a glass fibre-reinforced polymer composite comprising a multidimensional fibre dispersion within a solid polymer matrix, wherein at least some of the glass fibres are in contact with graphene dispersed in said polymer, and wherein the composite displays changes in bulk electrical resistance or electrical conductivity when said composite is physically deformed.

The inventors have found that a composite according to the invention, wherein bi- or multi-directional dispersion of fibres (such as a textile or other structure) can provide an hitherto unknown ability to detect the deformation of a structure to which the composite is attached, acting as an efficient strain or deformation sensor.

The composite material can be manufactured to have more suitable or practical physical properties than those of the prior art, such as the Bragg grating discussed above.

Preferably, said change in resistance is reversible.

Preferably, the glass fibres are oriented in at least two directions.

Preferably, the fibres comprise the fibres of a textile. The textile may be woven or non-woven.

Preferably, the composite comprises a laminate structure in which the glass fibres are arranged in multiple fibrous layers within the polymer matrix.

The graphene may be present as a coating on the glass fibres or may be contained within the glass fibres. Alternatively, the glass fibres may be distributed throughout the binding polymer.

According to another aspect of the invention, there is provided a strain gauge comprising the glass fibre-reinforced polymer composite described above.

According to another aspect of the invention, there is provided the use of the glass fibre-reinforced polymer composite described above in the manufacture of a strain gauge.

According to another aspect of the invention, there is provided the use of the detection of change in the electrical resistance, or electrical conductivity, of the glass fibre-reinforced polymer composite described above in the measurement of strain or deformation.

According to another aspect of the invention, there is provided a structure which incorporates an integrated strain gauge for monitoring strain in the structure, wherein the structure or the strain gauge incorporates the glass fibre-reinforced polymer composite described above.

Now will be described, by way of specific, non-limiting examples, a preferred embodiment of the invention with reference to the figures.

BRIEF DESCRIPTION OF THE FIGURES

FIG. 5 shows the graphed change in gauge factor of an FRP according to the invention under different levels of force.

DETAILED DESCRIPTION OF THE INVENTION

Figure 1:
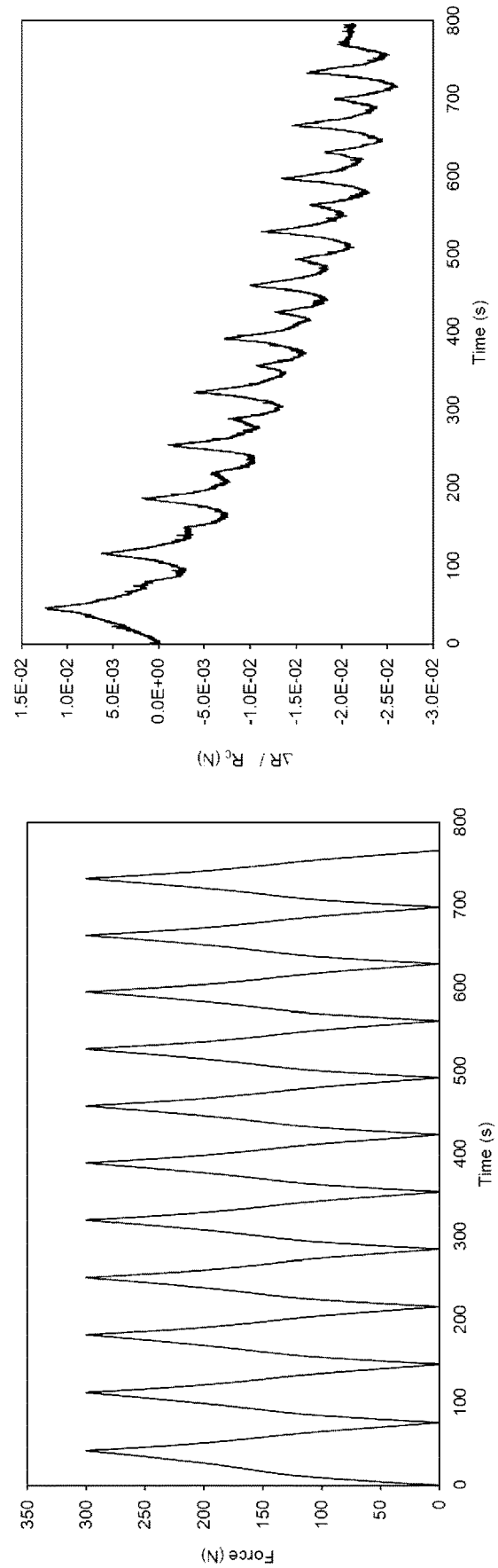
FIG. 1 is a load-time graph for ten subsequent cycles of three-point bending of an FRP according to the invention, and the change in electrical response of an FRP according to the invention during ten subsequent cycles of three-point bending.

The present invention is embodied in a fibre-reinforced polymer (FRP) that incorporates sufficient graphene that is in contact with said fibres for e.g. piezoresistive qualities to be imparted to said polymer. This allows the polymer to be used as a sensor, wherein a physical deformation in the sensor will produce a measurable change in electrical properties of the FRP.

Various forms of graphene exist. Ideal graphene is pure carbon and is free of compositional defects and/or other chemical impurities, such as oxygen. Ideal graphene is highly conductive. Graphene oxide (GO) is a highly oxidised form of graphene that is an electrical insulator.

Intermediary species of GO can be referred to by various descriptions, such as partially reduced graphene oxide (prGO) or functionalised graphene, where various different chemical groups are attached to the edges and/or basal planes of the graphene.

Taking advantage of this functionality allows tailoring of the electrical and physical properties of the graphene, for example to make it easier to incorporate into or onto materials, such as plastics, to form composites.

Incorporation of heteroatoms, where carbon atoms are replaced by other atoms, such as nitrogen, and other covalently bonded atoms can also be used to tailor the properties of graphene.

Graphene can also come in various physical formats, including single layers or multiple layers of graphene. Various terminologies have been used to describe the structural variations and some attempts have been made at standardising terminology. The various single-layer and multi-layer graphene structures are all referred to herein as "graphene" unless otherwise specified.

The various forms of graphene lie on a continuous scale from electrically conductive to electrically insulating. This means many forms of graphene can be used as electrical conductors. Even relatively poorly conducting graphene can serve the purpose, especially where its other physical properties make it useful for a given application.

Graphene can be produced by many synthesis routes, including but not limited to: anodic bonding; carbon nanotube cleavage; chemical exfoliation; chemical synthesis; chemical vapour deposition; electrochemical exfoliation; electrochemical intercalation; growth on silicon carbide; liquid phase exfoliation; micromechanical cleavage; microwave exfoliation; molecular beam epitaxy; photo-exfoliation; precipitation from metal, and; thermal exfoliation.

Some of these routes give rise to materials referred to variously as: chemically converted graphene; few-layer graphene; GO; graphene; graphene oxide; graphene nanoflakes; graphene nanoplatelets; graphene nanoribbons; graphene nanosheets; graphite nanoflakes; graphite nanoplatelets; graphite nanosheets; graphite oxide; LCGO; liquid crystal graphene oxide; multi-layer graphene; partially reduced graphene oxide; partially reduced graphite oxide; prGO; rGO; reduced graphene oxide; reduced graphite oxide.

Incorporation of graphene into or onto glass fibres can be achieved by many methods, but in each case the properties of the fibres and the textile will affect the method of incorporation. The method of incorporation will depend on graphene chemistry, graphene shape and processes used to incorporate the graphene into or onto the fibres.

For synthetic or composite fibres, preferred methods include mixing the graphene into the polymer or composite prior to forming synthetic fibres. Both natural and synthetic fibres can be coated with graphene to make a conductive fibre. One method of coating glass fibres with graphene is described below in example 1.

The conductivity and piezoresistive response of the composite can be controlled by adjusting the amount of graphene included in the composite. In general, the greater the amount of graphene, the greater the conductivity of the composite facilitating detection by electrical means.

Below the electrically conductive threshold, no electrical signal can be extracted from the polymer, so no piezoresistive response would normally be detected. However, above the electrical percolation threshold the piezoresistive response depends on the strength of the interactions between the graphene platelets and can be optimised to give an optimal signal to noise ratio.

For dispersion of graphene into a polymer suitable for making synthetic or composite fibres, the graphene can be present as a powder or as a dispersion in a fluid. Pre-dispersion of the graphene in a suitable fluid facilitates dispersion of the graphene throughout the polymer.

Methods of incorporating graphene into a polymer include: melt-compounding of graphene into the polymer; in-situ polymerisation of the polymer with the graphene; and solution blending. Whichever technique is used, it is desirable that the graphene is sufficiently dispersed to achieve electrical conductivity with a minimum of added graphene. In some cases, additives are required to reduce phase separation of the graphene and the polymer.

In one embodiment of the present invention, the glass fibres are in the form of a textile. The concentrated form of the graphene polymer dispersion is mixed and diluted in the melt extrusion process to obtain the desired concentration of graphene in the fibres.

In another embodiment, a concentrated form of graphene is dispersed in a fluid, such as: oil, solvent or water prior to incorporate in or on the glass fibres.

Electrical measurements rely on electrical conductivity to form a circuit. The electrical resistance of said circuit depends on the size and length of the conductive path and the conductivity of the conductive media. This combination of variables gives a wide range over which the measurements can be effective.

Where the measurement is made using an FRP according to the invention, tuning the measurement method to the desired outcome and conditions will typically be required. This allows the electrical resistance of the composite to also be tailored to the desired application and measurement methods. Methods for doing this are well known in the art.

In some cases, the change in resistance is large and the circuit path is short. In some embodiments, the resistance of a circuit may be measured, in others it is the capacitance or inductance of the circuit that may be measured.

The glass fibres in the FRP are preferably oriented in at least two directions. For example, the glass fibres can be arranged in a bi-directional structure. In one embodiment, the glass fibres are woven together to form a fibrous two-dimensional layer such that some glass fibres in the layer are substantially orthogonal to other fibres in the layer.

In another embodiment, the fibres are formed into a three-dimensional structure, for example the glass fibres may comprise a textile in which fibres are oriented randomly in three dimensions.

The present invention will now be described with reference to the following non-limiting examples.

Example 1: Composite Laminate

The type of structure used in this example was glass fibre woven into a twill weave, with a weight of 300 g per sq/m.

The glass fibres were coated on each side with a graphene dispersion. The dispersion comprised 2 wt % graphene nanoplatelets (GNP), 94 wt % water, 4 wt % acrylic polymer, and <1 wt % cellulose polymer.

The coated fabrics were left to dry overnight at room temperature, followed by drying in a vacuum oven at 40° C. to remove excess water prior to composite fabrication.

The dry graphene coating was approximately 106 μm thick. An epoxy resin (bisphenol-A-(epichlorohydrin)) and its associated amine-based hardener were mixed in a ratio of 100/25 to form a polymer matrix, and the graphene-coated glass fibres were impregnated in the epoxy resin.

A composite laminate structure was created by layering ten plies of the glass fibre impregnated resin via a wet lay-up technique, followed by vacuum-assisted curing at −700 mmHg for 24 hours at 25° C. The laminate structure was then left to cure overnight in ambient conditions and post-treated at 65° C. for 6 hours, forming a composite in which layers of glass fibre were bound within a solid polymer matrix.

Mechanical and electrical testing was performed on samples of a composite prepared as described above. Three-point bending tests were performed on 120 mm×50 mm pieces of the composite in accordance with ASTM D7264. Tensile tests were performed on 250 mm×25 mm pieces of the composite in accordance with ASTM D3039.

FIG. 1 shows a load-time graph for ten subsequent cycles of three-point bending and the change in electrical response during the ten cycles. The change in voltage indicates the change in resistance of the sample.

Each loading cycle was performed at a rate of 0.5 mm sec-1 and a sampling frequency of 100 Hz, reaching a maximum force of 300N.

As can be seen in FIG. 1, the voltage changes in response to the applied bending load, indicating an increase in resistance with deformation of the FRP. In each loading cycle, the resistance increases in proportion to the applied load and recovers to the original value after unloading, which is consistent with piezoresistive behaviour. In other words, the composite is acting as a strain sensor in which mechanical bending displacement is converted into an electrical response.

It is hypothesised that the graphene layers within the FRP composite create an electrically conductive network which is responsive to dimensional changes. When a mechanical load is applied to the composite, the electrical resistance of the composite changes due to changes in electrical conductivity between graphene platelets.

When the composite is bent, one side is under is placed under tension and the other side is placed under compression. Tension increases the overall sensor resistance by increasing the distance between graphene platelets, while compression decreases the resistance by decreasing the distance between graphene platelets. These two opposing behaviours reduce the net change in sensor resistance.

Gauge factor is a well-known measure of the sensitivity of the electrical response of an FRP. Typically, a gauge factor of around 11 is desirable, but higher is advantageous. Most FRP composites have a gauge factor in the range 3 to 10. However, as can be seen in FIG. 5, the FRP of the present example demonstrates a gauge factor in excess of 11 at loadings of less than 4000 N.

Example 2: Coated Glass Fibre Composite

GF-epoxy composites were formed from four piles of continuous filaments of Advantex glass in random orientation (from Owens Corning Pty Ltd) while epoxy resin consisting of Prime 20LV and Prime 20 slow hardener (from Gruit) at weight ratio 100:26 and mixed for 2 mins. This was was spread within the fabrics using a brush. The laminate was vacuumed at −700 mmHg for 24 hrs at 25ºC, followed by post-curing in an oven at 65ºC for 6 hrs. The 0.5 mm thick laminate was cut to 15×4 cm tokens using a diamond cutter.

Two samples of the laminate were dip coated with two different concentrations (28 mg/ml and 65 mg/ml) of aqueous GNP dispersion in acrylic. Each face was coated four times. Each side was electrically insulated from the other. Electrical contacts were made to both top (compressive) and bottom (tensile) coatings. Silver conductive paint was used to minimise contact resistance changes during testing.

Figure 2:
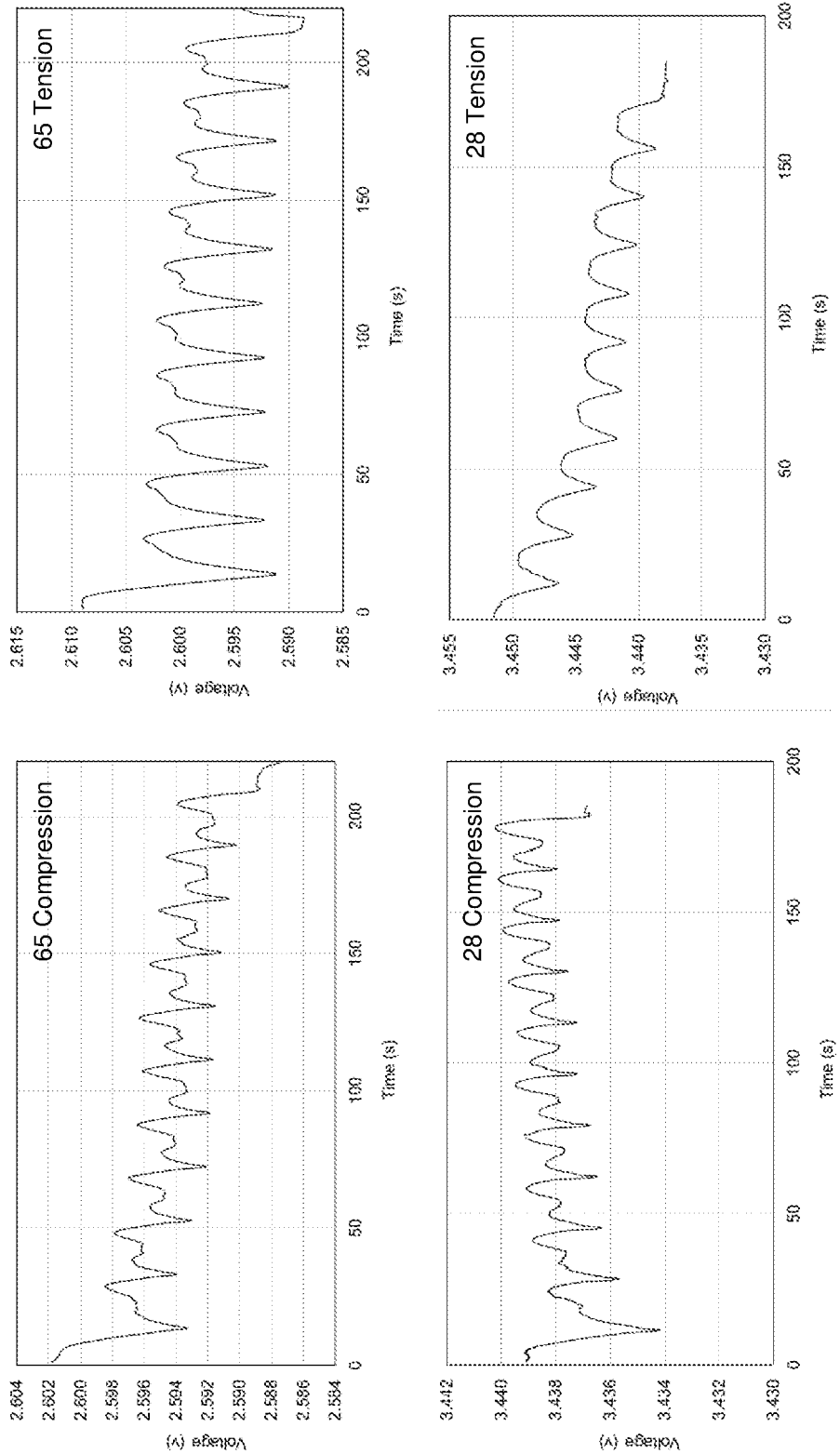
FIG. 2 shows graphed data for both compressive and tensile changes in an FRP according to the invention.

The samples were subjected to three-point bending tests at a rate of 30 mm/min with a maximum force of 6N applied using an Instron material testing machine. FIG. 2 shows data for each sample for both compressive and tensile changes.

Example 3: Coated Glass Fibre Composite Bend Test

Figure 3:
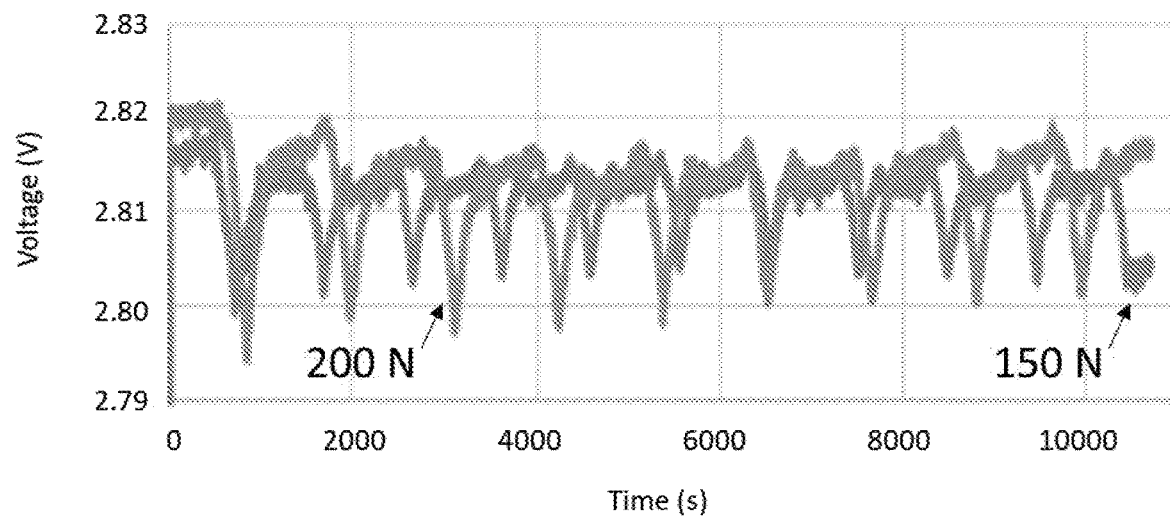
FIG. 3 shows the graphed results of a three-point compression bending mode up to a maximum force and cycled 10 times on a FRP according to the invention.

A sample of the FRP from Example 2 was tested in three-point compression bending mode up to a maximum force and cycled 10 times. Two different tests used maximum forces of 150N and 250N. The results are shown in FIG. 3.

Example 4: Coated Glass Fibre Composite Impact Test

Figure 4:
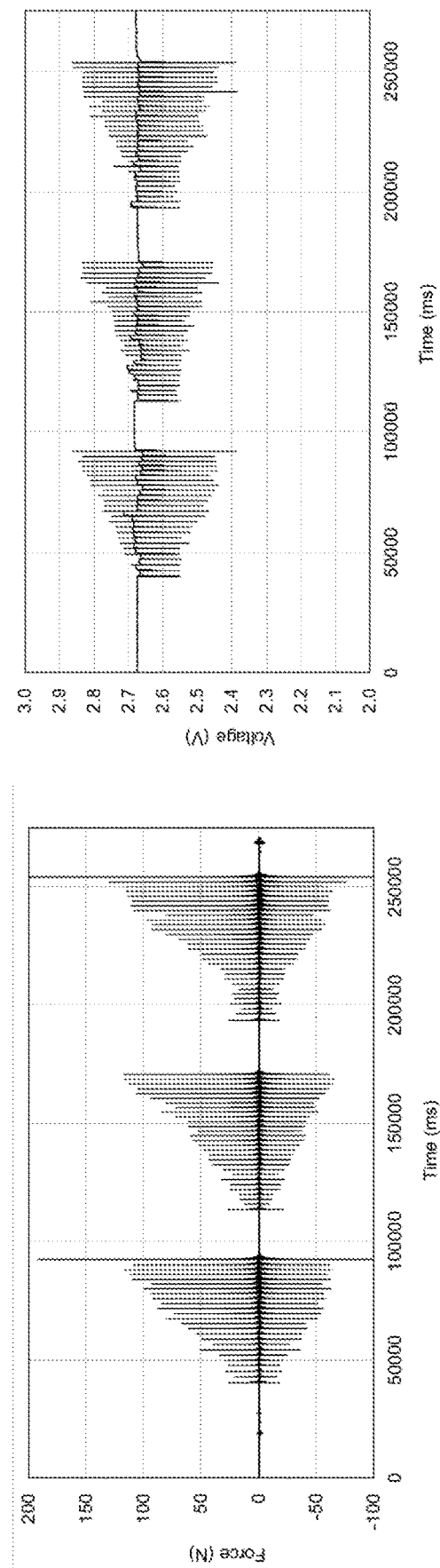
FIG. 4 shows the graphed voltage response of an FRP according to invention when subjected to impact compression.

A sample of the FRP from Example 2 was adhered to a force plate (Type 9260AA6, Kistler, Winterthur, Switzerland) and a series of impacts up to 200N were applied and the voltage response recorded, as can be seen in FIG. 4.

Three sets of data were recorded and linear fits to each set gave relatively linear relationship between applied force and voltage change with $R^2=0.89$ (±0.02).

A similar test at higher impacts up to 1000N showed the response is relatively linear with $R^2=0.898$.

It will be appreciated by those skilled in the art that the above described embodiment is merely one example of how the inventive concept can be implemented. It will be understood that other embodiments may be conceived that, while differing in their detail, nevertheless fall within the same inventive concept and represent the same invention.

The invention claimed is:

1. A fibre-reinforced polymer composite comprising glass fibres bound within a solid polymer matrix, wherein at least some of the glass fibres are in contact with graphene, wherein the composite changes electrical resistance when deformed, and wherein the fibres comprise the fibres of a non-woven textile.

2. The fibre-reinforced polymer composite of claim 1, wherein the fibres further comprise polyester fibres.

3. The fibre-reinforced polymer composite of claim 1, further comprising:
   a plurality of layers making up the fibre-reinforced polymer composite.

* * * * *